(12) United States Patent
Xu et al.

(10) Patent No.: US 12,032,989 B2
(45) Date of Patent: Jul. 9, 2024

(54) TIMER PROCESSING METHOD, APPARATUS, ELECTRONIC DEVICE AND COMPUTER STORAGE MEDIUM

(71) Applicant: Alibaba Group Holding Limited, Grand Cayman (KY)

(72) Inventors: Yun Xu, Hangzhou (CN); Yibin Shen, Hangzhou (CN); Xiantao Zhang, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 37 days.

(21) Appl. No.: 17/698,402

(22) Filed: Mar. 18, 2022

(65) Prior Publication Data
US 2022/0206840 A1 Jun. 30, 2022

Related U.S. Application Data

(63) Continuation of application No. PCT/CN2020/116465, filed on Sep. 21, 2020.

(30) Foreign Application Priority Data

Sep. 25, 2019 (CN) .......................... 201910913341.0

(51) Int. Cl.
G06F 9/48 (2006.01)
G06F 9/455 (2018.01)

(52) U.S. Cl.
CPC ........ G06F 9/4825 (2013.01); G06F 9/45558 (2013.01); G06F 2009/45575 (2013.01)

(58) Field of Classification Search
CPC ............... G06F 9/4825; G06F 9/45558; G06F 2009/45575
See application file for complete search history.

(56) References Cited

U.S. PATENT DOCUMENTS 7,475,002 B1 * 1/2009 Mann .................. G06F 9/45558
718/1
7,945,908 B1 5/2011 Waldspurger et al.
(Continued)

FOREIGN PATENT DOCUMENTS

CN 105474127 A 4/2016
CN 107506234 A 12/2017
(Continued)

OTHER PUBLICATIONS

Translation of International Search Report for corresponding PCT Application No. PCT/CN2020/116465 mailed Apr. 1, 2021, 2 pages.
(Continued)

*Primary Examiner* — Henry Tsai
*Assistant Examiner* — John B Roche
(74) *Attorney, Agent, or Firm* — Lee & Hayes, P.C.

(57) ABSTRACT

Timer processing method, apparatus, electronic device and computer storage medium are provided. The timer processing method includes: determining to perform timer switching on a virtual local timer used by a virtual processor according to preset timer switching condition(s); determining a physical processor that runs the virtual processor, and switching a physical local timer currently used by the physical processor to a physical global timer; and performing a timer configuration for the virtual processor to enable the physical local timer to act as a timer of the virtual processor. Through the embodiments of the present disclosure, additional overheads of a virtual machine system caused by operations of conversion of virtual timer and physical timer are avoided.

20 Claims, 11 Drawing Sheets

(56) References Cited

U.S. PATENT DOCUMENTS

| | | | |
|---|---|---|---|
| 8,539,010 B2 | 9/2013 | Inakoshi | |
| 10,310,890 B2* | 6/2019 | Matsumoto | G06F 9/48 |
| 10,534,421 B2 | 1/2020 | Wohlgemuth et al. | |
| 2006/0161421 A1* | 7/2006 | Kissell | G06F 9/4812 |
| | | | 703/26 |
| 2009/0132846 A1* | 5/2009 | Song | G06F 1/14 |
| | | | 713/502 |
| 2009/0259870 A1* | 10/2009 | Sharma | G06F 9/45533 |
| | | | 713/400 |
| 2010/0138881 A1* | 6/2010 | Park | H04N 21/43615 |
| | | | 386/E5.003 |
| 2010/0169634 A1* | 7/2010 | Pan | G06F 9/4401 |
| | | | 713/2 |
| 2012/0224591 A1* | 9/2012 | Tsunedomi | H04L 12/40026 |
| | | | 370/458 |
| 2016/0179716 A1 | 6/2016 | An et al. | |
| 2017/0185443 A1* | 6/2017 | Kokkonen | G06F 9/44505 |
| 2017/0311352 A1* | 10/2017 | Lv | H04W 74/002 |
| 2018/0011733 A1* | 1/2018 | Tsirkin | G06F 9/455 |
| 2019/0296744 A1* | 9/2019 | Wallichs | H03K 19/0008 |

FOREIGN PATENT DOCUMENTS

| | | |
|---|---|---|
| CN | 107924322 A | 4/2018 |
| CN | 108241522 A | 7/2018 |
| CN | 109032772 A | 12/2018 |
| CN | 109952560 A | 6/2019 |

OTHER PUBLICATIONS

Translation of Written Opinion for corresponding PCT Application No. PCT/CN2020/116465 mailed Dec. 21, 2020, 3 pages.

Translation of First Chinese Office Action for corresponding Chinese Application No. 201910913341.0, 6 pages.

English Translation of Chinese 2nd Office Action for corresponding Chinese Patent Application No. 201910913341.0 dated Feb. 24, 2024, 6 pages.

* cited by examiner

TIMER PROCESSING METHOD, APPARATUS, ELECTRONIC DEVICE AND COMPUTER STORAGE MEDIUM

CROSS REFERENCE TO RELATED PATENT APPLICATIONS

This application claims priority to and is a continuation of PCT Patent Application No. PCT/CN2020/116465 filed on 21 Sep. 2020, and is related to and claims priority to Chinese Application No. 201910913341.0, filed on 25 Sep. 2019 and entitled "Timer Processing Method, Apparatus, Electronic Device and Computer Storage Medium," which are incorporated herein by reference in their entirety.

TECHNICAL FIELD

The present disclosure relates to the field of computer technology, and in particular, to timer processing methods, apparatuses, electronic devices, and computer storage media in a virtual machine scenario.

BACKGROUND

A timer is a basic component of a computer. Regular executions of a number of components in an operating system depend on a timing function, and application programs also use the timing function. However, a single timer device on hardware can only provide limited timing functions at the same time. For example, apic-timer can only provide one timing function for one cpu. In order to meet timing requirements of each component in a system, a physical timer device is managed by a kernel, and the kernel provides timing services at the same time, setting timing requirements of each component to the physical timer device in an order of timeout.

For virtual machine systems such as a KVM system that implement virtual machine functions through multiple CPUs, the KVM system acts as a hypervisor, and runs on a host's kernel, providing hardware simulation functions for a guest (guest machine), which include a function of apic-timer. At present, a hypervisor still uses timer services of a host's kernel to provide timing functions. In such scenario, the hypervisor needs to be able to convert a guest's operation on apic-timer into a timing service provided by the host. This requires the hypervisor to be able to intercept the guest's operation on the apic-timer. However, such interception will trigger a vmexit event and a vmentry event of the virtual machine system to implement expensive context switching, resulting in an additional overhead for the virtual machine system, and causing a significant reduction in throughput and a significant increase in delay for a virtual machine.

In addition, multi-threaded applications in a virtual machine system have scenarios of waking up each other. For this reason, virtual machine systems such as a Linux-based KVM generally adopt a dynamic clock mode. In this way, two timer operations are introduced for each wake-up. For those workloads with relatively light single tasks, such as redis, nginx, etc., a virtualization overhead introduced by the timer operations at this time may even be greater than overheads of these tasks, leading to a significant reduction in throughput and a significant increase in delay.

Therefore, how to process a timer in a virtual machine scenario to avoid an additional overhead of a virtual machine, such as a reduction in throughput and an increase in delay of the virtual machine as described above, has become a problem to be solved urgently.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Accordingly, the embodiments of the present disclosure provide a timer processing solution to solve some or all of the above-mentioned problems.

According to the embodiments of the present disclosure, a timer processing method is provided, and includes: determining to perform timer switching on a virtual local timer used by a virtual processor according to preset timer switching condition(s); determining a physical processor that runs the virtual processor, and switching a physical local timer currently used by the physical processor to a physical global timer; and performing a timer configuration for the virtual processor to enable the physical local timer to act as a timer of the virtual processor.

According to the embodiments of the present disclosure, a timer processing apparatus is provided, and includes: a determination module configured to determine to perform timer switching on a virtual local timer used by a virtual processor according to preset timer switching condition(s); a switching module configured to determine a physical processor that runs the virtual processor, and switching a physical local timer currently used by the physical processor to a physical global timer; and a configuration module configured to perform a timer configuration for the virtual processor to enable the physical local timer to act as a timer of the virtual processor.

According to the embodiments of the present disclosure, an electronic device is provided, and includes: a processor, a memory, a communication interface, and a communication bus. The processor, the memory, and the communication interface conduct inter-communications each other through the communication bus. The memory is configured to store at least one executable instruction, and the executable instruction causes the processor to perform operations corresponding to the timer processing method described in the first aspect.

According to the embodiments of the present disclosure, a computer storage medium having a computer program stored thereon is provided. When the program is executed by a processor, the timer processing method as described in the first aspect is implemented.

According to the timer processing solutions provided by the embodiments of the present disclosure, when timer switching condition(s) is/are met, a physical local timer used by a physical processor is switched to a physical global timer in a unit of physical processor. As such, a virtual local timer used by a virtual processor running on such physical processor is switched into a physical local timer. As a result, the virtual processor can directly use timing services provided by the physical local timer, without the need to switch an operation mode of a virtual machine system to convert an operation of the virtual local timer to an operation of the physical local timer. Therefore, a vmexit event and a vmentry event of the virtual machine system are not triggered, and context switching and additional overhead of the virtual machine system caused by the vmexit event and the vmentry event are thus avoided, thereby preventing a reduction in throughput and an increase in delay of a virtual machine from being occurred.

BRIEF DESCRIPTION OF THE DRAWINGS

In order to more clearly illustrate the technical solutions in the embodiments of the present disclosure, drawings that need to be used for describing the embodiments or the existing technologies will be briefly introduced as follows. Apparently, the drawings in the following description represent only some of the embodiments described in the embodiments of the present disclosure. For one of ordinary skill in the art, other drawings may be obtained based on these drawings.

DETAILED DESCRIPTION

In order to enable one skilled in the art to better understand the technical solutions in the embodiments of the present disclosure, the technical solutions in the embodiments of the present disclosure will be described clearly and completely in conjunction with the accompanying drawings in the embodiments of the present disclosure. Apparently, the described embodiments represent only a part and not all of the embodiments of the present disclosure. Based on the embodiments in the embodiments of the present disclosure, all other embodiments obtained by one of ordinary skill in the art should fall within the scope of protection of the embodiments of the present disclosure.

Specific implementations of the embodiments of the present disclosure will be further described below in conjunction with the drawings of the embodiments of the present disclosure.

First, it is explained that the timer processing solutions provided by the embodiments of the present disclosure can be applied to a scenario of virtual machine system. A virtual machine system is a system that implements one or more virtual computer functions based on a physical machine through virtual machine software installed in the physical machine. In a virtual machine system, a virtualized computer is also called a guest machine, which is usually represented as a Guest, i.e., a logical computer. An operating system running on the Guest is usually called as a Guest OS. A physical machine is also called a host machine, and is usually expressed as a HOST. An operating system running on the HOST is usually called a Host's OS.

Figure 1:
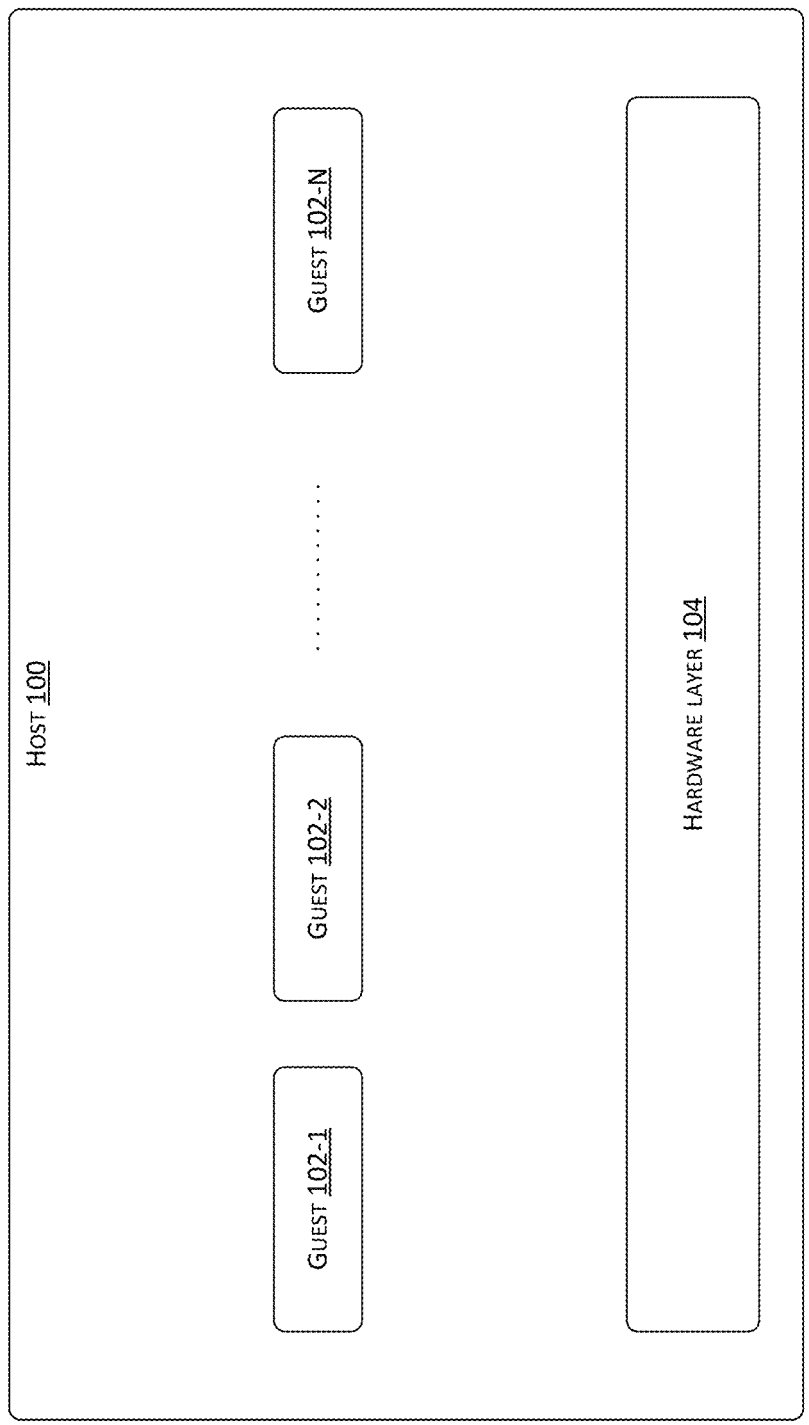
FIG. 1 is a schematic structural diagram of a host machine.

A structure of a host machine (host) 100 is shown in FIG. 1. As can be seen from FIG. 1, the host machine includes guests 102-1, . . . , 102-N, and a hardware layer 104. Guests virtualized on the host machine through virtual machine software include guest 102-1, . . . , guest 102-N in FIG. 1, for example. These guests works like a real computer. A guest can be installed with an operating system and applications, and can also access network resources. For an application running in a guest, it works as if working in a real computer. The hardware layer in the host machine is a hardware platform running in a virtualized environment, which can provide hardware resources for each guest. The hardware layer may include, but are not limited to, a variety of hardware resources, such as a processor CPU, a memory, a network card, a storage device, and other hardware resources, etc. In practical applications, the hardware layer may also include any other appropriate hardware resources required for operations of guest(s).

The timer processing solutions provided in the embodiments of the present disclosure will be described hereinafter based on the foregoing structure.

Figure 2:
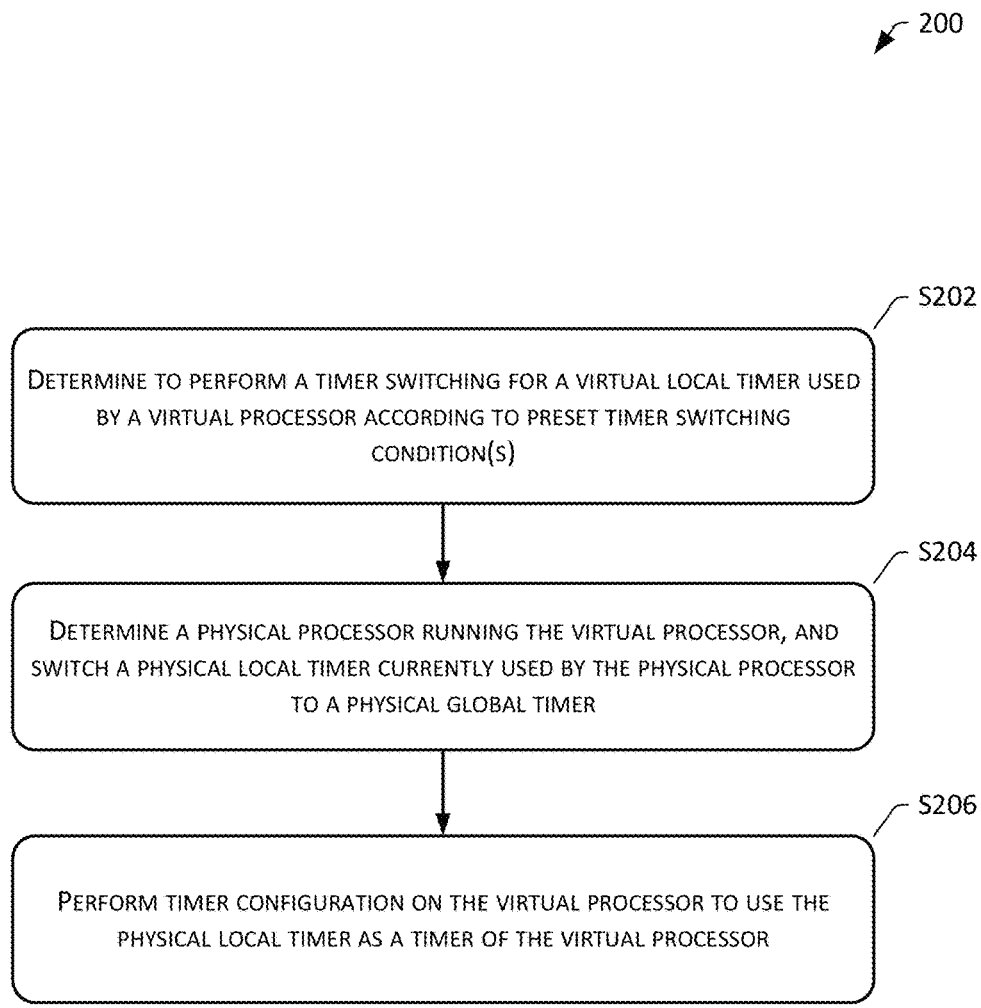
FIG. 2 is a flowchart of a timer processing method according to the embodiments of the present disclosure.

FIG. 2 shows a flowchart of a timer processing method 200 according to the embodiments of the present disclosure.

The timer processing method 200 includes the following steps:

Step S202: Determine to perform a timer switching for a virtual local timer used by a virtual processor according to preset timer switching condition(s).

In a process of implementing a virtual computer through virtual machine software, it is usually necessary to perform tasks such as CPU virtualization, memory virtualization, and I/O virtualization, etc. In terms of CPU virtualization, a physical machine may have multiple physical CPUs (PCPU), and each physical CPU may virtualize one or more virtual CPUs (VCPU). In other words, each VCPU corresponds to one PCPU, but each PCPU may correspond to one or more VCPUs.

Physical timer devices that are set in a physical machine are fixed, and can usually be divided into local timers and global timers. Local timers include apic-timer, etc., and global timers include HPET (High Precision Event Timer) and PIT (Programmable Interval Timer), etc. A quantity of each type of global timer that is configured generally does not exceed one, but each physical processor may be configured with its own local timer. A clock interrupt generated by a global timer can be delivered to any physical processor, and a clock interrupt generated by a local timer will only be delivered to a physical processor connected thereto. Since a priority of a local timer is higher than a priority of a global timer, under normal circumstances, a physical processor will select its own local timer unless the local timer is disabled.

Similarly, each virtual processor is also configured with a virtual local timer, and an operation of the virtual local timer needs to be able to be converted into an operation of a physical local timer configured for a physical processor running the virtual processor. However, existing conversion operations will incur an additional virtual machine overhead. For this reason, the embodiments of the present disclosure provide timer processing solutions to reduce or avoid the above virtual machine overhead.

Through this step, a determination to switch a virtual local timer is made according to preset timer switching condition(s). In other words, through this step, a timing of performing a timer switching of a virtual local timer for a running virtual processor can be made.

The preset timer switching condition(s) can be appropriately set by one skilled in the art according to actual requirements in order to meet actual application requirements.

It should be noted that, in the embodiments of the present disclosure, if there is no special description, quantities related to "multiple", such as "many", "a number of", etc., all represent two or more.

Step S204: Determine a physical processor running the virtual processor, and switch a physical local timer currently used by the physical processor to a physical global timer.

As mentioned above, a virtual processor corresponds to a physical processor, and each physical processor can be configured with its own physical local timer.

Since the operation of the virtual local timer needs to be converted into the operation of the physical local timer configured by the physical processor running the virtual processor, in order to avoid an additional virtual machine overhead caused by existing conversion operations, this step switch a timer for a physical processor running the virtual processor, and switch a physical local timer currently used by the physical processor to a physical global timer. Therefore, through an operation of a subsequent step S106, the virtual processor that meets the preset timer switching condition(s) can directly perform operations on the physical local timer. At the same time, the corresponding physical processor can use the global timer to provide timer services for other virtual processors.

When multiple types and/or multiple types of physical global timers are configured in the host machine, a timer to be switched can be selected by one skilled in the art according to requirements, for example, according to priority, etc. Generally speaking, the priority of HPET is higher than those of other global timers. Therefore, in order to improve the switching efficiency and save the switching costs, a physical local timer can be switched to a HPET timer.

Step S206: Perform timer configuration on the virtual processor to use the physical local timer as a timer of the virtual processor.

After switching the timer of the physical processor to the physical global timer, the original physical local timer can provide services for the current virtual processor. In other words, the virtual processor can directly operate on the physical local timer, and exclusively occupy resources of the physical local timer. Therefore, there is no need to perform the foregoing conversion operation in the existing technologies, and the additional virtual machine overhead caused by the existing conversion operations is avoided.

Through this embodiment, when timer switching condition(s) is/are met, a physical local timer used by a physical processor is switched to a physical global timer in a unit of physical processor. As such, a virtual local timer used by a virtual processor running on such physical processor is switched into a physical local timer. As a result, the virtual processor can directly use timing services provided by the physical local timer, without the need to switch an operation mode of a virtual machine system to convert an operation of the virtual local timer to an operation of the physical local timer. Therefore, a vmexit event and a vmentry event of the virtual machine system are not triggered, and context switching and additional overhead of the virtual machine system caused by the vmexit event and the vmentry event are thus avoided, thereby preventing a reduction in throughput and an increase in delay of a virtual machine from being occurred.

The timer processing method in this embodiment can be executed on any appropriate electronic device that can run a virtual machine system such as a KVM system, including but not limited to: a server, a mobile terminal (such as a tablet computer, a mobile phone, etc.), and a PC, etc.

Figure 3:
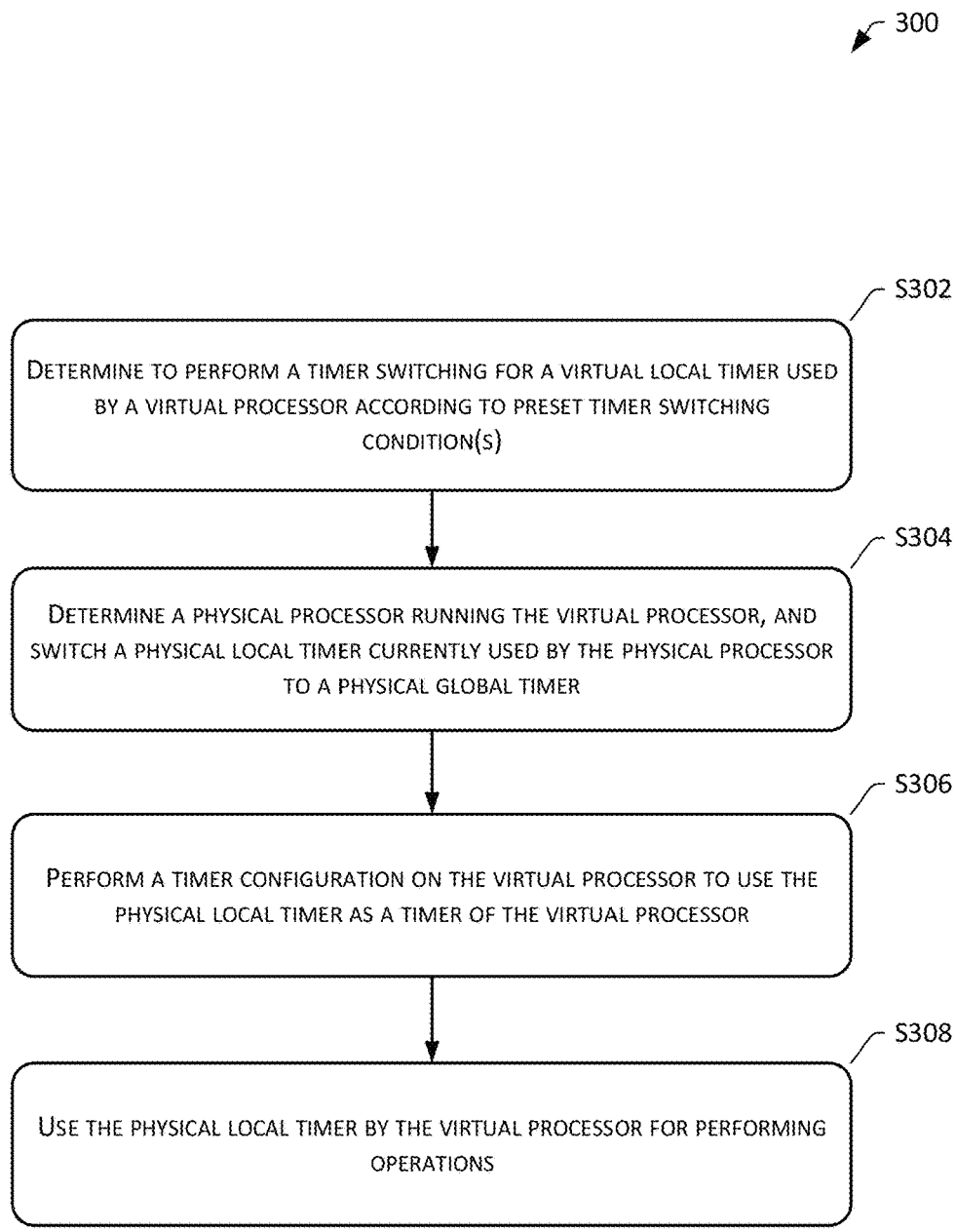
FIG. 3 is a flowchart of a timer processing method according to the embodiments of the present disclosure.

FIG. 3 shows a flowchart of a timer processing method 300 according to the embodiments of the present disclosure.

The timer processing method 300 includes the following steps:

Step S302: Determine to perform a timer switching for a virtual local timer used by a virtual processor according to preset timer switching condition(s).

In a feasible way, a determination of performing a timer switching for a virtual local timer used by a virtual processor may be made according to a running state of the virtual processor.

Furthermore, in implementations, if the virtual processor is in a virtual local timer enabled state and the virtual processor is scheduled to run, a determination of performing a timer switching for a virtual local timer used by the virtual processor is made.

Similar to physical processors, operations of a virtual processor also depend on an interrupt function. Accordingly, a running state of a virtual processor can reflect its demand for an interrupt function. Therefore, a determination of whether to perform a timer switching for a virtual local timer can be made according to a running state of the virtual processor, which is simple and easy to implement, and reduces the cost of timer switching.

On this basis, whether the virtual local timer is in an enabled state and whether the virtual processor is scheduled to run can be used as bases for determining whether to perform a timer switching. A scheduled operation of the virtual processor will lead to an operation of the timer, and a determination that is made in this way makes a determination about the timing of performing a timer switching to be more accurate.

However, the present disclosure is not limited to the above method. One skilled in the art can also set other appropriate timer switching conditions according to actual needs, such as according to an interrupt signal or according to an operation of the virtual local timer. Other timer switching conditions are also applicable to the solutions of the embodiments of the present disclosure.

Step S304: Determine a physical processor running the virtual processor, and switch a physical local timer currently used by the physical processor to a physical global timer.

As mentioned above, a selection of a physical global timer to be switched can be configured by one skilled in the art according to actual needs, and can be based on a priority or an idle state, etc., which is not limited in the embodiments of the present disclosure.

For example, when a guest starts, a virtual apic-timer used thereby uses a virtual path, and an access to the virtual apic-timer will still be intercepted by a hypervisor. When a timer switching condition is met, for example, the virtual apic-timer is in an enabled state and the guest has a scheduling behavior, the hypervisor will first switch a host's timer from a physical apic-timer to another timer, such as HPET.

Step S306: Perform a timer configuration on the virtual processor to use the physical local timer as a timer of the virtual processor.

In practical applications, a feasible way of this step includes: adapting the virtual local timer of the virtual processor to the physical local timer, and constructing a processing function used for interrupt processing for the virtual processor after adaptation; stopping the virtual local timer and setting up a permission of directly accessing the physical local timer for the virtual processor.

Adapting the virtual local timer of the virtual processor to the physical local timer can be implemented by: adapting an operation of the virtual processor on the virtual local timer to the physical local timer through a virtual machine monitor.

Stopping the virtual local timer and setting up the permission of directly accessing the physical local timer for the virtual processor can be implemented by: stopping the virtual local timer, and configuring the permission of directly accessing the physical local timer for the virtual processor through the virtual machine monitor.

A virtual machine monitor, such as a hypervisor, is an intermediate software layer that runs between a host and operating system(s), allowing multiple operating systems and applications to share hardware. The virtual machine monitor can access all physical devices, including magnetic disks and memory, on the host. The virtual machine monitor not only coordinates accesses to these hardware resources, but also imposes protection between various guests. When the host starts and executes the virtual machine monitor, operating systems of all guests are loaded, and allocations of resources and configurations of permissions can be performed for the guests.

For example, after the hypervisor switches the host's timer from a physical apic-timer to HPET, a guest's previous operations on the virtual apic-timer can be set to the real physical apic-timer, and a configuration of the hypervisor can then be adjusted to grant the guest a permission of directly accessing the physical apic-timer. Subsequently, the guest's timeout setting for the physical apic-timer will not trigger a vmexit event and a vmentry event, thereby avoiding a virtualization overhead.

Through the above method, an existing virtual machine monitor can be effectively used, and corresponding functions can be realized efficiently and at a low cost.

In implementations, in a feasible way, adapting the virtual local timer of the virtual processor to the physical local timer, and constructing the processing function for the interrupt processing for the virtual processor after adaptation may include: configuring an interrupt number of the virtual processor for the physical local timer as a preset interrupt number, and binding the preset interrupt number to the processing function for the interrupt processing, wherein the processing function is used for converting the interrupt number of the virtual processor for the physical local timer into the preset interrupt number, and used for performing timer timeout processing. The interrupt number can be appropriately set by one skilled in the art according to actual needs, as long as it does not conflict with other interrupt numbers. The processing function bound to the preset interrupt number can also be set by one skilled in the art in any appropriate manner according to needs, as long as basic rules and requirements for an interrupt processing function are met.

In addition to setting a timeout interval, a timer also needs to have the capability of timeout notifications. Such notifications are usually implemented through interrupts. Notifications for different hardware are distinguished by different interrupt numbers. In order to prevent an operation of a Guest from affecting a host, in this embodiment, an interrupt number configured by a Guest for an apic-timer is forcibly modified to a preset interrupt number (which is required to be distinguished from interrupt number(s) of the host). The preset interrupt number can be realized by interrupt number reservation. In addition, an auxiliary processing function is bound to the preset interrupt number, and such processing function can realize a conversion from the preset interrupt number to the original interrupt number, and inject it into the Guest to realize a notification function for timer timeout.

Step S308: Use the physical local timer by the virtual processor for performing operations.

After having the permission of operation on the physical local timer, the virtual processor can directly use the physical local timer to perform operations, which include, but are not limited to, interrupt processing operations.

Through the above process, a virtual processor's timer operation without virtualization overhead is realized. Furthermore, an online switching function of a physical timer is realized on a Kernel of a host, which can actively control whether each PCPU uses an apic-timer to provide timer services.

Figure 4A:
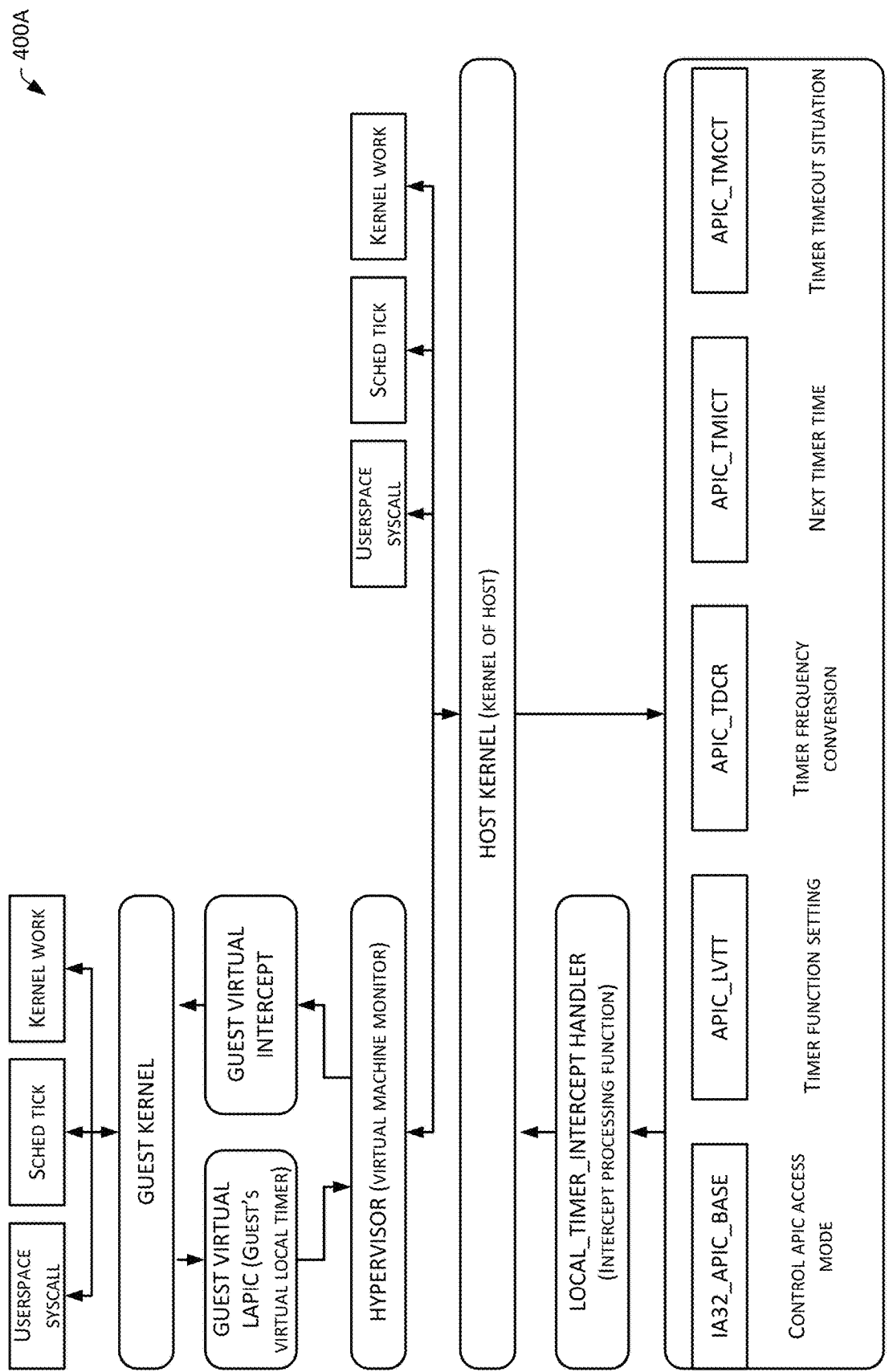
FIG. 4A is a schematic diagram of a timer setting of an existing KVM system.

A LINUX-based KVM system is taken as an example below to illustrate the above process. A timer setting 400A of an existing KVM system is shown in FIG. 4A. As can be seen from FIG. 4A, a virtual local timer (GUEST VIRTUAL LAPIC) of a guest is controlled by a guest kernel (GUEST KERNEL) of a virtual processor, which works in scenarios such as userspace syscall (a timer function is implemented in a kernel mode, and an application in a user mode needs to use it through syscall interaction), sched tick (periodical scheduling), and kernel work (some tasks of the kernel, such as device loading, timer flushing, etc.), etc. A virtual machine monitor (HYPERVISOR) monitors GUEST VIRTUAL LAPIC, and hands over an interrupt signal generated by GUEST VIRTUAL LAPIC to GUEST KERNEL for processing. At the same time, an operation on GUEST VIRTUAL LAPIC needs to be converted into an operation on an actual physical timer, that is, APIC in FIG. 4A. The operation of GUEST VIRTUAL LAPIC is first intercepted by HYPERVISOR, and HYPERVISOR then calls a related interface of HOST KERNEL of the host to set the timer APIC. In FIG. 4A, APIC is controlled by the host's kernel HOST KERNEL (physical processor), which can also work in scenarios such as userspace syscall, sched tick, and kernel work, etc. When receiving information of the operation of GUEST VIRTUAL LAPIC through HYPERVISOR, HOST KERNEL adapts the operation of GUEST VIRTUAL LAPIC to APIC, and generates a physical interrupt through APIC. After the physical interrupt, an interrupt processing function (LOCAL_TIMER_INTERRUPT HANDLER) of a hardware platform of the host can be directly called, and an entry of this processing function is set by the kernel. Through LOCAL_TIMER_INTERRUPT HANDLER, virtual timers that have been registered on a current PCPU can be traversed, and a comparison with the virtual timers is made to determine whether a timeout occurs. If timeout occurs, a processing function of the virtual timer is called. In this way, interrupt processing of the virtual timer is realized. For APIC, an access mode of APIC can be controlled through IA32_APIC_BASE. Setting of a timer function is performed through APIC_LVTT. Setting of a timer frequency conversion is performed through APIC_TDCR. Setting of a next timer's time is performed through APIC_T-MICT, and setting of a timer timeout situation is performed through APIC_TMCCT.

As can be seen from FIG. 4A, in the existing timer setting method, a large number of setting and cancellation operations for a timer exist on a key path of a KVM system, which frequently trigger vmexit events and vmentry events, and introduces additional overheads.

Figure 4B:
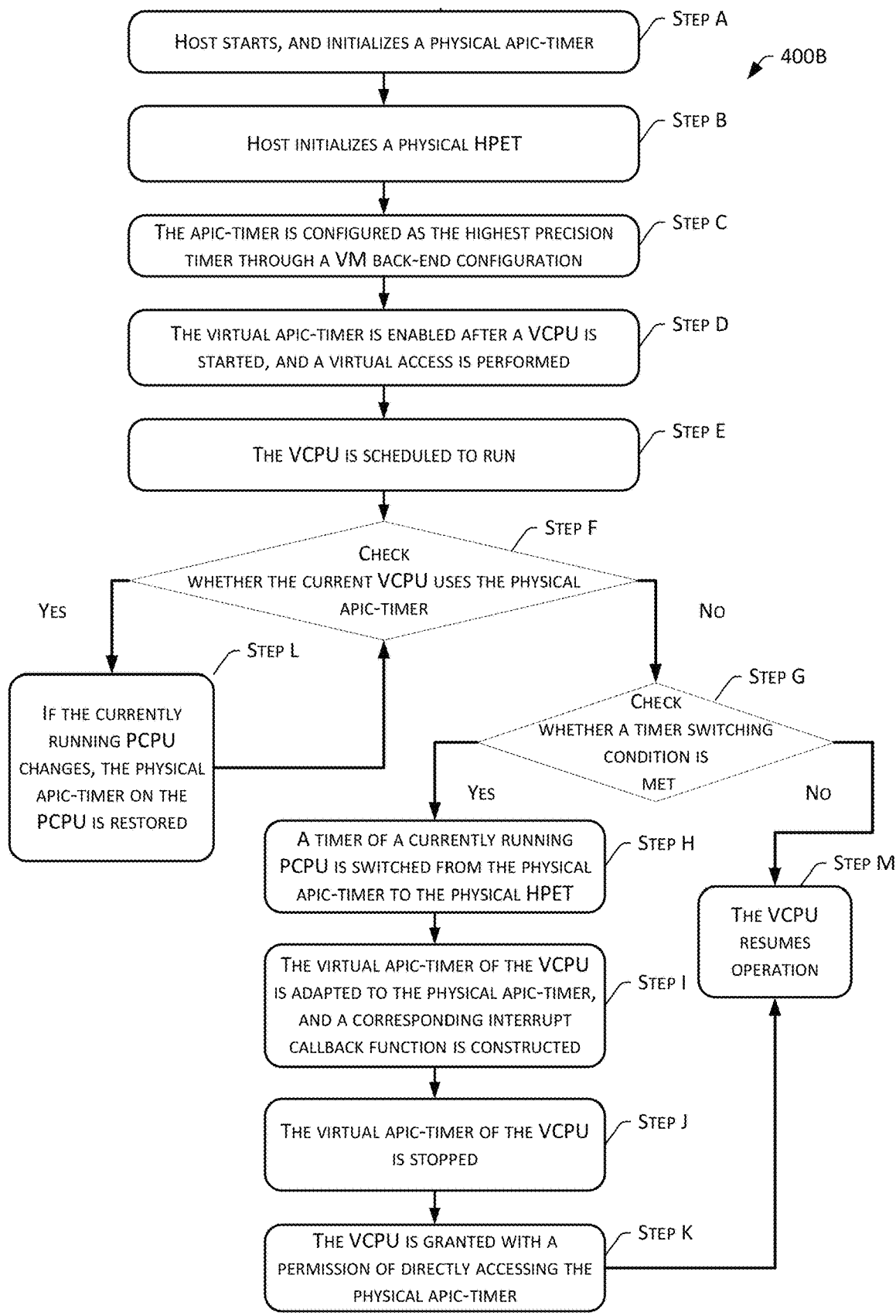
FIG. 4B is a schematic diagram of a process of timer switching in a usage scenario of the embodiment shown in FIG. 3.

To avoid the above additional overheads, as shown in FIG. 4B, a process 400B of timer switching in a timer switching scenario of a KVM system provided by the embodiments of the present disclosure is shown as follows:

Step A: Host starts, and initializes a physical apic-timer.

Step B: Host initializes a physical HPET.

Step C. The apic-timer is configured as the highest precision timer through a VM back-end configuration.

Step D: The virtual apic-timer is enabled after a VCPU is started, and a virtual access is performed.

Step E: The VCPU is scheduled to run.

Step F: Checking whether the current VCPU uses the physical apic-timer is performed, and the process proceeds to step L if affirmative, or proceeds to step G if not.

Step G: Checking whether a timer switching condition is met is performed, and the process proceeds to step M if not, or step H is executed if met.

Step H: A timer of a currently running PCPU is switched from the physical apic-timer to the physical HPET.

Step I: The virtual apic-timer of the VCPU is adapted to the physical apic-timer, and a corresponding interrupt callback function is constructed.

Step J: The virtual apic-timer of the VCPU is stopped.

Step K: The VCPU is granted with a permission of directly accessing the physical apic-timer, and the process proceeds to step M.

Step L: If the currently running PCPU changes, the physical apic-timer on the PCPU is restored, and the process returns to step F.

Step M. The VCPU resumes operation.

In implementations, after the VCPU resumes operation, it is possible to return to step E until the currently running VCPU changes or the currently running PCPU changes. In addition, after the VCPU changes or the currently running PCPU changes, for a VCPU that newly starts running, the solution of this example can be executed from step D.

Figure 4C:
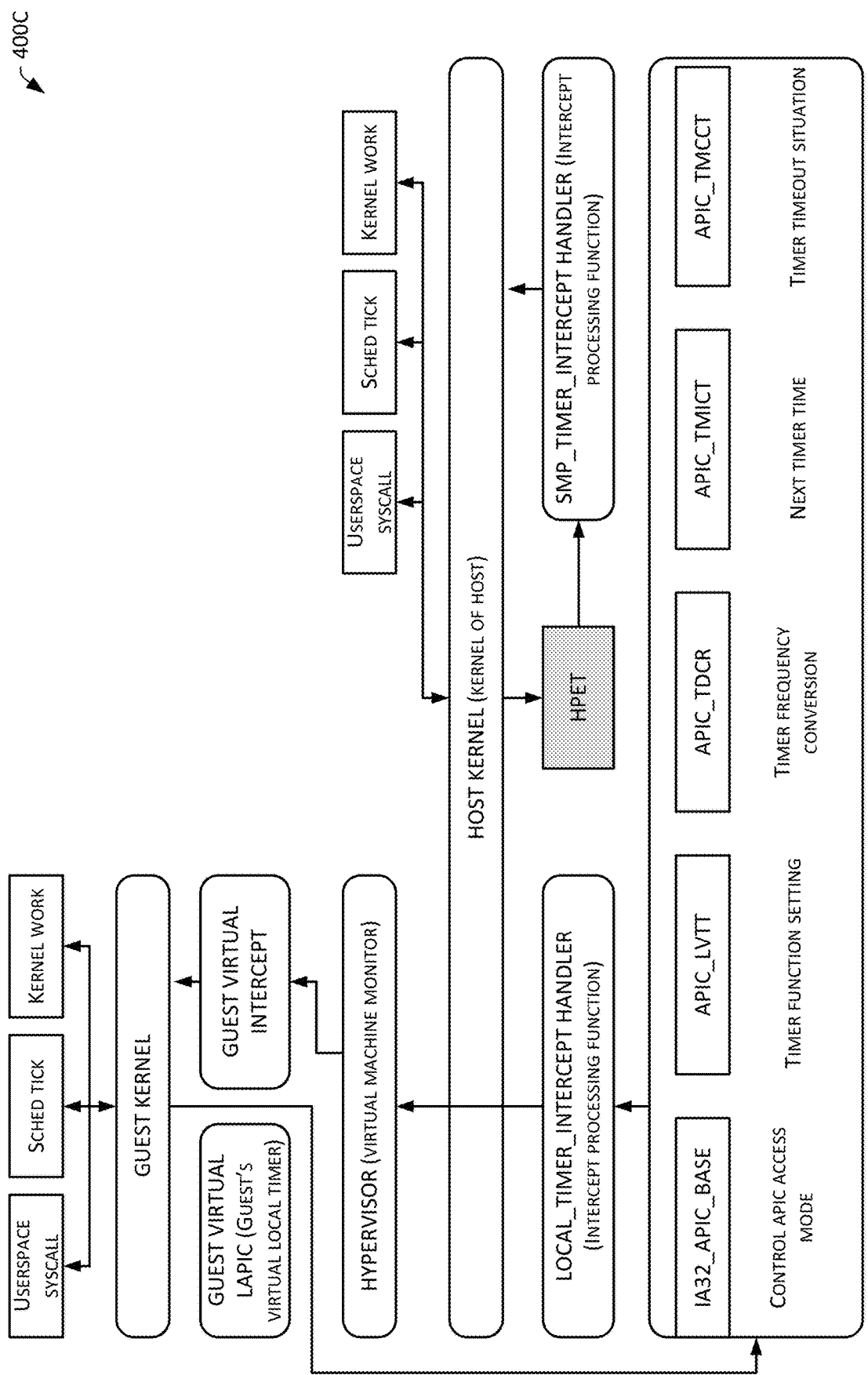
FIG. 4C is a schematic diagram of a timer setting after switching a timer of a KVM system through the process shown in FIG. 4B.

A timer setting 400C after switching through the above process is shown in FIG. 4C. As can be seen from FIG. 4C, the virtual local timer, GUEST VIRTUAL LAPIC, used by the original GUEST KERNEL is switched to the physical timer APIC, while the timer used by HOST KERNEL is switched to HPET. HOST KERNEL processes an interrupt generated by HPET through an interrupt processing function (SMP_TIMER_INTERRUPT HANDLER) that matches with HPET. After switching, GUEST KERNEL can directly operate the hardware resource, APIC, on the host, and GUEST KERNEL no longer needs to interact with HYPERVISOR and HOST KERNEL, thus greatly improving the performance of the guest. After switching to APIC, interrupts generated by the hardware directly call a virtual processing function (VCPU_TIMER_INTERRUPT HANDLER) of HYPERVISOR for interrupt processing through a reserved interrupt number.

As can be seen from FIG. 4C, in the improved timer setting method, a host of a KVM system uses a physical global timer, while a guest monopolizes a physical local timer, preventing vmexit events and vmentry events from being triggered in timer switching, and avoiding an introduction of additional overheads.

Through this embodiment, when timer switching condition(s) is/are met, a physical local timer used by a physical processor is switched to a physical global timer in a unit of physical processor. As such, a virtual local timer used by a virtual processor running on such physical processor is switched into a physical local timer. As a result, the virtual processor can directly use timing services provided by the physical local timer, without the need to switch an operation mode of a virtual machine system to convert an operation of the virtual local timer to an operation of the physical local timer. Therefore, a vmexit event and a vmentry event of the virtual machine system are not triggered, and context switching and additional overhead of the virtual machine system caused by the vmexit event and the vmentry event are thus avoided, thereby preventing a reduction in throughput and an increase in delay of a virtual machine from being occurred.

The timer processing method in this embodiment can be executed on any appropriate electronic device that can run a virtual machine system such as a KVM system, including but not limited to: a server, a mobile terminal (such as a tablet computer, a mobile phone, etc.), and a PC, etc.

Figure 5:
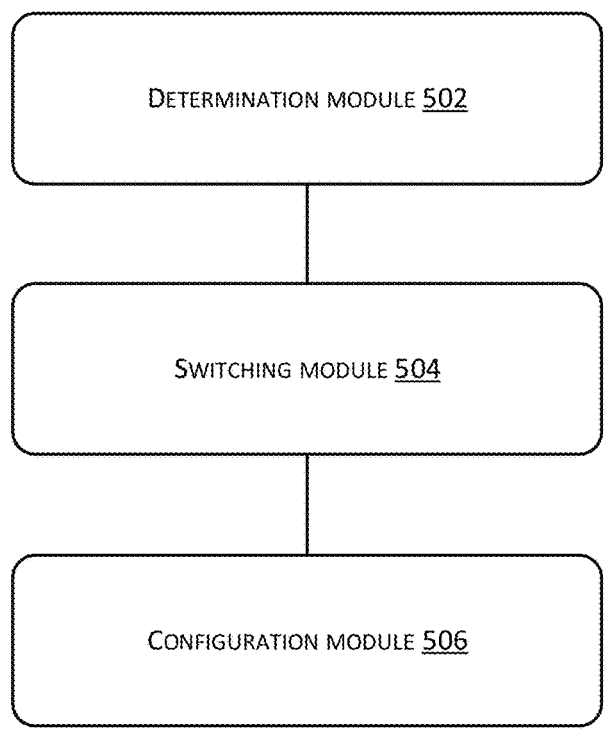
FIG. 5 is a structural block diagram of a timer processing apparatus according to the embodiments of the present disclosure.

FIG. 5 shows a structural block diagram of a timer processing apparatus 500 according to the embodiments of the present disclosure.

The timer processing apparatus 500 includes: a determination module 502 configured to determine to perform a timer switching of a virtual local timer used by a virtual processor according to preset timer switching condition(s); a switching module 504 configured to determine a physical processor running the virtual processor, and switch a physical local timer currently used by the physical processor to a physical global timer; and a configuration module 506 configured to perform a timer configuration for the virtual processor to enable the physical local timer to act as a timer of the virtual processor.

The timer processing apparatus 500 may be set in a physical processor of a host, or may be set independently of a physical processor, and controlled by the physical processor for execution, so as to implement corresponding timer switching processing.

The timer processing apparatus 500 is used to implement corresponding timer processing methods in the foregoing multiple method embodiments, and has the beneficial effects of the corresponding method embodiments, which are not repeated herein. In addition, the functional realization of each module in the timer processing apparatus of this embodiment can be referenced to a description of a corresponding part in the foregoing method embodiments, and details thereof are not repeated herein.

Figure 6A:
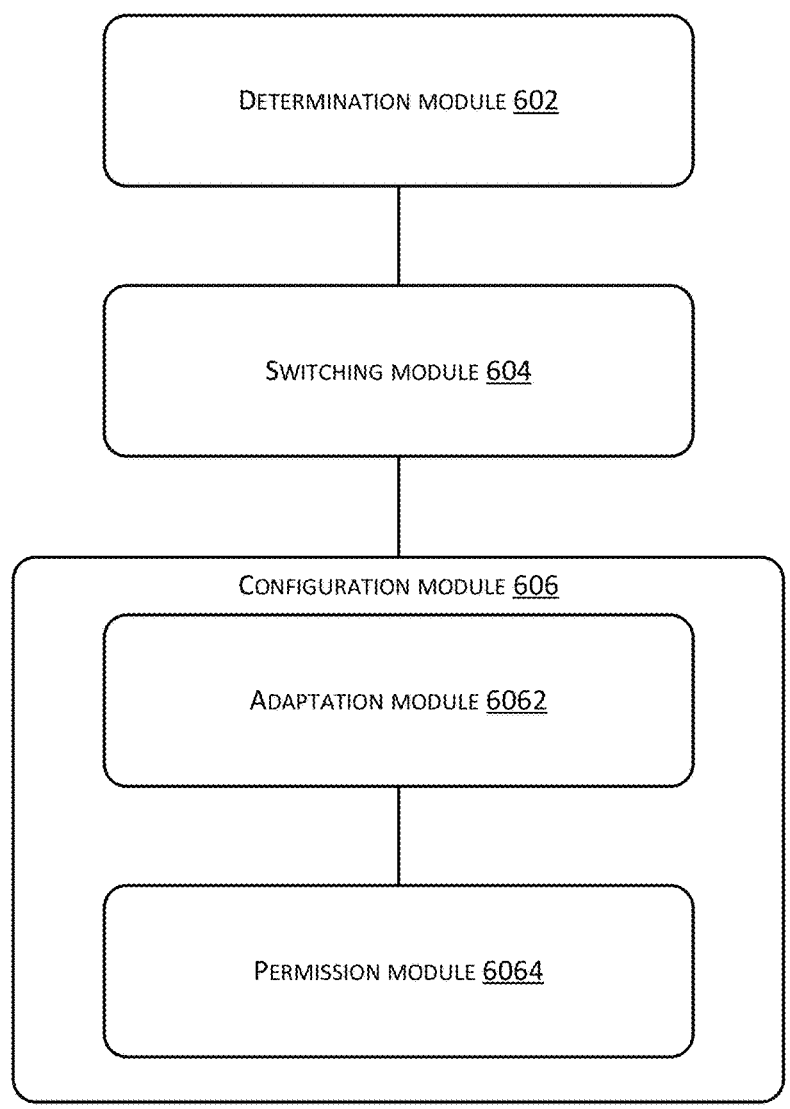
FIG. 6A is a structural block diagram of a timer processing apparatus according to the embodiments of the present disclosure.

FIG. 6A shows a structural block diagram of a timer processing apparatus 600A according to the embodiments of the present disclosure.

The timer processing apparatus 600A includes: a determination module 602 configured to determine to perform a timer switching of a virtual local timer used by a virtual processor according to preset timer switching condition(s); a switching module 604 configured to determine a physical processor running the virtual processor, and switch a physical local timer currently used by the physical processor to a physical global timer; and a configuration module 606 configured to perform a timer configuration for the virtual processor to enable the physical local timer to act as a timer of the virtual processor.

In implementations, the configuration module 606 includes: an adaptation module 6062, configured to adapt the virtual local timer of the virtual processor to the physical local timer, and construct a processing function for interrupt processing for the virtual processor after adaption; and a permission module 6064 configured to stop the virtual local timer and set a permission for the virtual processor to directly access the physical local timer.

In implementations, the adaptation module 6062 is configured to configure an interrupt number of the virtual processor for the physical local timer as a preset interrupt number, and bind the preset interrupt number to the processing function for the interrupt processing, wherein the processing function is used for converting the interrupt number of the virtual processor for the virtual local timer into the preset interrupt number, and performing timer timeout processing.

In implementations, the adaptation module 6062 is configured to adapt an operation of the virtual processor on the virtual local timer to the physical local timer through a virtual machine monitor, and construct the processing function for the interrupt processing for the virtual processor after the adaptation; and the permission module 6064 configured to stop the virtual local timer, and set the permission for the virtual processor to directly access the physical local timer through the virtual machine monitor.

In implementations, the determination module 602 is configured to determine to switch the timer of the virtual local timer used by the virtual processor according to a running state of the virtual processor.

In implementations, the determination module 602 is configured to determine that the timer switching is performed for the virtual local timer used by the virtual processor if the virtual processor is in a virtual local timer enabled state and the virtual processor is scheduled to run.

In implementations, the physical local timer is an apic-timer, and the physical global timer is a HPET timer.

The timer processing apparatus 600A may be set in a physical processor of a host; or may be set independently of a physical processor, and controlled by the physical processor for execution, so as to implement corresponding timer switching processing.

Figure 6B:
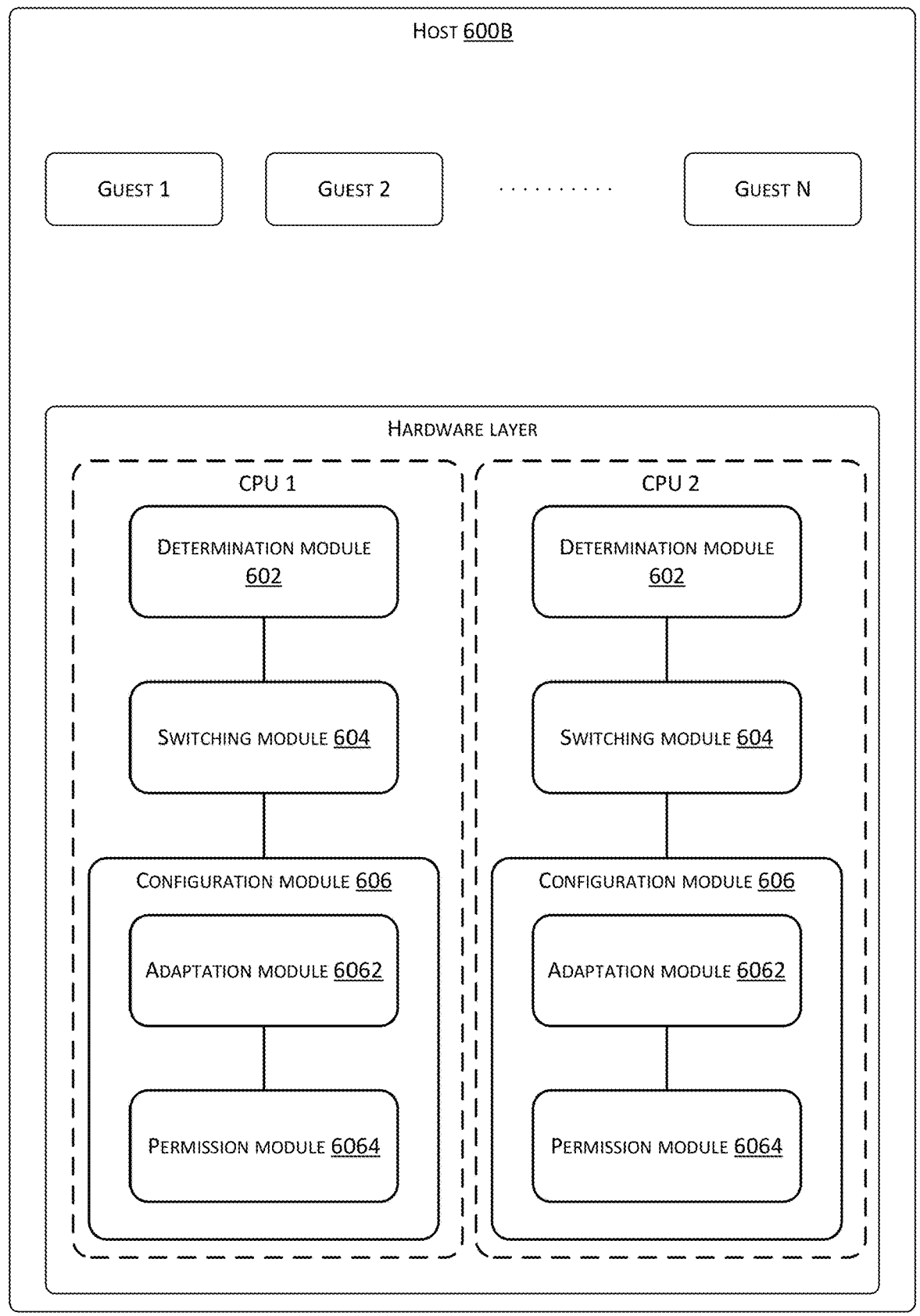
FIG. 6B is a schematic diagram of a specific setting scenario of the timer processing apparatus shown in FIG. 6A.

A schematic diagram of a physical processor that is set in a host 600B is shown in FIG. 6B. As mentioned above, a hardware layer of the host 600B may include a variety of hardware resources, which include, but are not limited to, a processor CPU, a memory, a network card, a storage device, etc. FIG. 6B only schematically shows two processor CPUs in the hardware layer, and the timer processing apparatus can be set in these two processor CPUs, as shown in FIG. 6B in detail.

The timer processing apparatus is used to implement corresponding timer processing methods in the foregoing multiple method embodiments, and has the beneficial effects of the corresponding method embodiments, which are not repeated herein. In addition, the functional realization of each module in the timer processing apparatus of this embodiment can be referenced to a description of a corresponding part in the foregoing method embodiments, and details thereof are not repeated herein.

Figure 7:
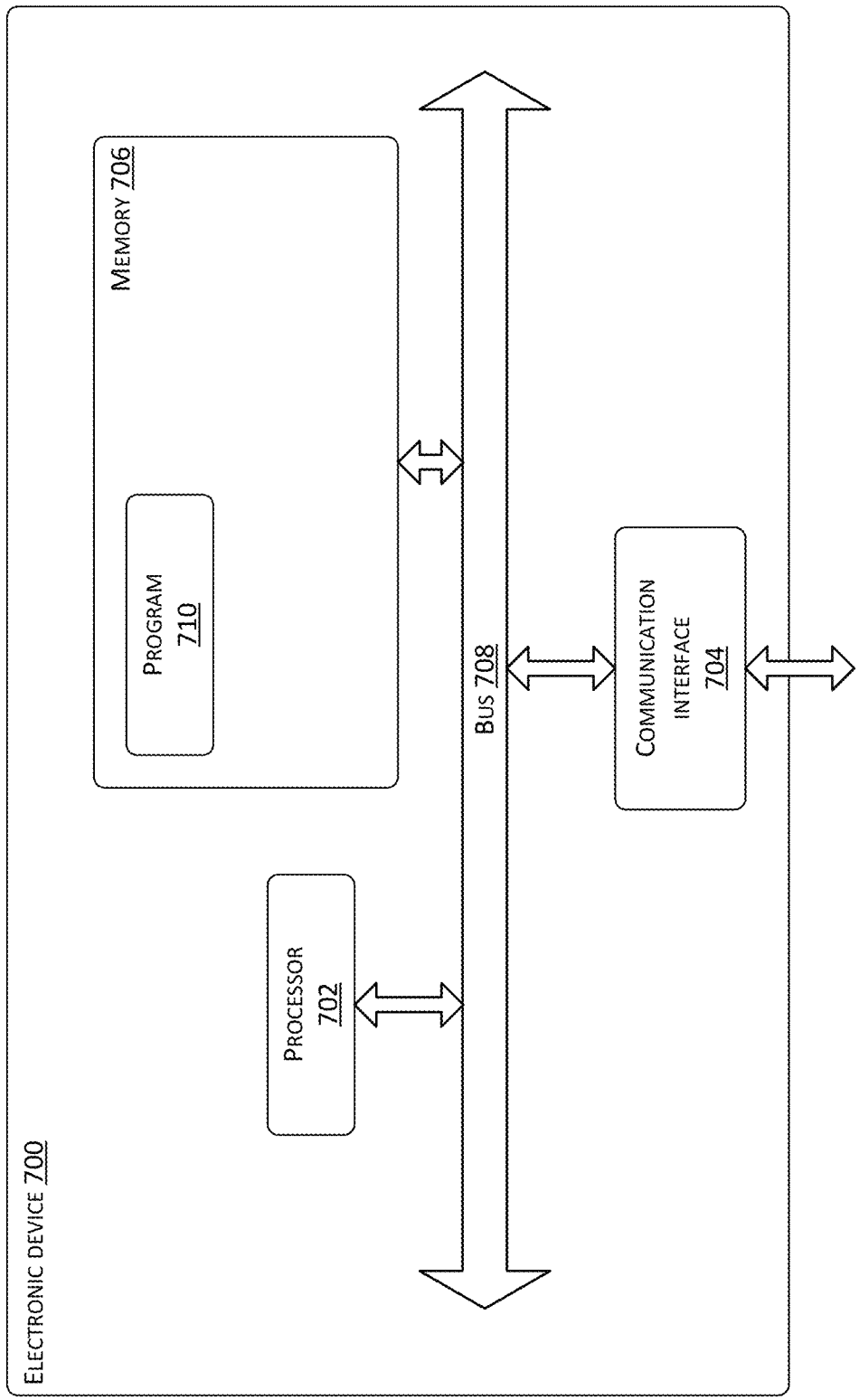
FIG. 7 is a schematic structural diagram of an electronic device according to the embodiments of the present disclosure.

FIG. 7 shows a schematic structural diagram of an electronic device 700 according to the embodiments of the present disclosure. The specific embodiment of the present invention does not limit specific implementations of the electronic device.

As shown in FIG. 7, the electronic device 700 may include: a processor 702, a communication interface 704, a memory 706, and a communication bus 708, wherein:
the processor 702, the communication interface 704, and the memory 706 communicate with each other through the communication bus 708;
the communication interface 704 is configured to communicate with other electronic devices such as terminal devices or servers; and
the processor 702 is configured to execute a program 710, and can specifically execute relevant steps in the foregoing timer processing method embodiments.

Specifically, the program 710 may include a program code, and the program code includes computer operating instructions.

The processor 702 may be a central processing unit (CPU), or an ASIC (Application Specific Integrated Circuit), or one or more integrated circuits configured to implement the embodiments of the present disclosure. The one or more processors included in the electronic device may be the same type of processor, such as one or more CPUs, or different types of processors, such as one or more CPUs and one or more ASICs.

The memory 706 is configured to store the program 710. The memory 706 may include a high-speed RAM memory, and may also include a non-volatile memory (non-volatile memory), for example, at least one magnetic storage disk.

The program 710 may specifically be configured to cause the processor 702 to perform the following operations: determining to perform timer switching on a virtual local timer used by a virtual processor according to preset timer switching condition(s); determining a physical processor that runs the virtual processor, and switching a physical local timer currently used by the physical processor to a physical global timer; and performing a timer configuration for the virtual processor to enable the physical local timer to act as a timer of the virtual processor.

In implementations, when performing the timer configuration for the virtual processor to enable the physical local timer to act as the timer of the virtual processor, the program 710 is further configured to cause the processor 702 to: adapt the virtual local timer of the virtual processor to the physical local timer, and construct a processing function for interrupt processing for the virtual processor after adaptation; and stop the virtual local timer, and set a permission for the virtual processor to directly access the physical local timer.

In implementations, when adapting the virtual local timer of the virtual processor to the physical local timer, and constructing the processing function for the interrupt processing for the virtual processor after the adaptation, the program 710 is further configured to cause the processor 702 to: configure an interrupt number of the virtual processor for the physical local timer as a preset interrupt number, and bind the preset interrupt number to the processing function for the interrupt processing, wherein the processing function is used for converting the interrupt number of the virtual processor for the virtual local timer into the preset interrupt number, and performing timer timeout processing.

In implementations, the program 710 is further configured to cause the processor 702 to: adapt an operation of the virtual processor on the virtual local timer to the physical local timer through a virtual machine monitor when adapting the virtual local timer of the virtual processor to the physical local timer; and cause the processor 702 to stop the virtual local timer, and set the permission for the virtual processor to directly access the physical local timer through the virtual machine monitor when stopping the virtual local timer, and setting the permission for the virtual processor to directly access the physical local timer.

In implementations, when determining to perform the timer switching of the virtual local timer used by the virtual processor according to the preset timer switching condition(s), the program 710 is further configured to cause the processor 702 to: determine to perform the timer switching of the virtual local timer used by the virtual processor according to a running state of the virtual processor.

In implementations, when determining to perform the timer switching of the virtual local timer used by the virtual processor according to the running state of the virtual processor, the program 710 is further configured to cause the processor 702 to: determine to perform the timer switching of the virtual local timer used by the virtual processor if the virtual processor is in a virtual local timer enabled state and the virtual processor is scheduled to run.

In implementations, the physical local timer is an apic-timer, and the physical global timer is a HPET timer.

For details of implementations of the steps in the program 710, reference may be made to corresponding descriptions in corresponding steps and units in the above-mentioned timer processing method embodiments, which are not repeated herein. One skilled in the art can clearly understand that, for the sake of convenience and conciseness of description, specific working processes of the devices and modules described above can be referred to corresponding process descriptions in the foregoing method embodiments, which are not be repeated herein.

Through the electronic device of this embodiment, when timer switching condition(s) is/are met, a physical local timer used by a physical processor is switched to a physical global timer in a unit of physical processor. As such, a virtual local timer used by a virtual processor running on such physical processor is switched into a physical local timer. As a result, the virtual processor can directly use timing services provided by the physical local timer, without the need to switch an operation mode of a virtual machine system to convert an operation of the virtual local timer to an operation of the physical local timer. Therefore, a vmexit event and a vmentry event of the virtual machine system are not triggered, and context switching and additional overhead of the virtual machine system caused by the vmexit event and the vmentry event are thus avoided, thereby preventing a reduction in throughput and an increase in delay of a virtual machine from being occurred.

Figure 8:
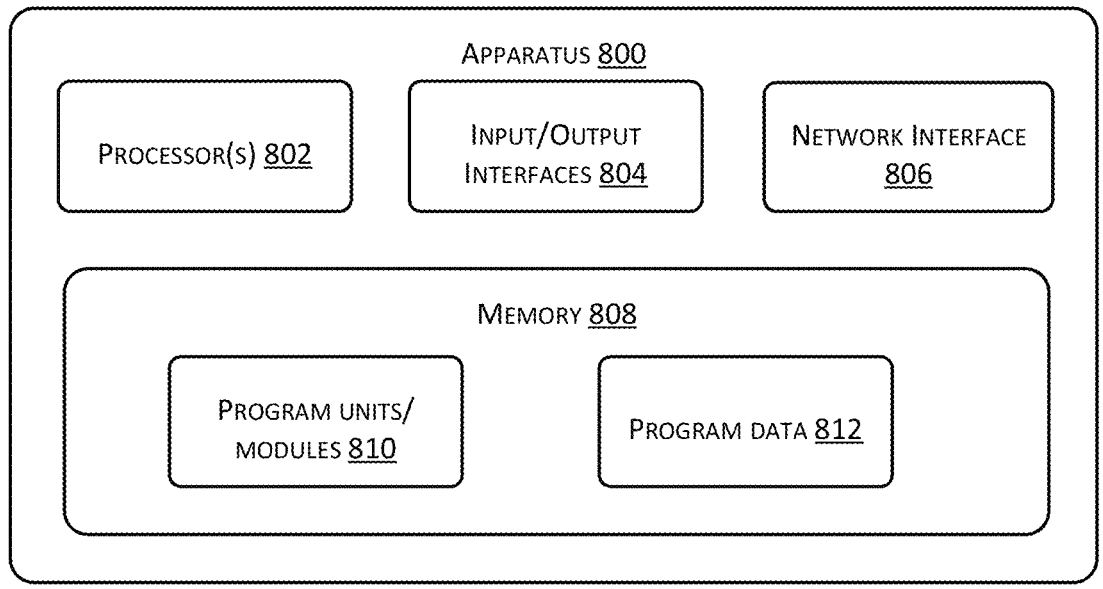
FIG. 8 is a structural block diagram of the example apparatuses described in FIGS. 5 and 6A in further detail.

FIG. 8 shows an example apparatus 800, such as the apparatuses shown in FIGS. 5 and 6A in further detail. In implementations, the example apparatus 800 may represent any one of the foregoing apparatuses. By way of example and not limitation, the apparatus 800 may include one or more processors 802, an input/output (I/O) interface 804, a network interface 806, and memory 808.

The memory 808 may include a form of computer readable media such as a volatile memory, a random access memory (RAM) and/or a non-volatile memory, for example, a read-only memory (ROM) or a flash RAM. The memory 808 is an example of a computer readable media. In implementations, the memory 808 may include program units/modules 810 and program data 812. The program units/modules 810 may include one or more of the foregoing units and/or modules as described in the foregoing embodiments and shown in the figures.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

It should be pointed out that according to the needs of implementations, each component/step described in the embodiments of the present invention can be split into more components/steps, or two or more components/steps or parts of operations of components/steps can be combined into new components/steps to achieve the purpose of the embodiments of the present invention.

The above methods according to the embodiments of the present invention can be implemented in hardware, firmware, or implemented as software or computer code that can be stored in a recording medium (such as CD ROM, RAM, a floppy disk, a hard disk, or a magnetic disk or an optical disk), or implemented as a computer code that is originally stored in a remote recording medium or a non-transitory machine-readable medium, downloaded through a network, and stored in a local recording medium. As such, the methods described herein can be processed by such software that is stored in a recording medium and uses a general-purpose computer, a dedicated processor, or a programmable or dedicated hardware (such as ASIC or FPGA). It can be understood that a computer, a processor, a microprocessor controller, or programmable hardware includes a storage component (for example, RAM, ROM, flash memory, etc.) that can store or receive a software or computer code. When the software or computer code is accessed and executed by a computer, a processor or hardware, the virtual machine hot migration method(s) described herein is/are implemented. In addition, when a general-purpose computer accesses code(s) for implementing the virtual machine hot migration method(s) shown herein, an execution of the code(s) converts the general-purpose computer into a special computer for executing the virtual machine hot migration method(s) shown herein.

One of ordinary skill in the art may be aware that the units and method steps of the examples described in combination with the embodiments disclosed herein can be implemented by electronic hardware or a combination of computer software and electronic hardware. Whether these functions are executed by hardware or software depends on specific applications and design constraint requirements of the technical solutions. One skilled in the art can use different methods for each specific application to implement the described functions, but such implementation should not be considered as going beyond the scope of the embodiments of the present invention.

The above implementations are only used to illustrate the embodiments of the present invention, and are not intended to limit the embodiments of the present invention. One of ordinary skill in the relevant technical field can also make various modifications and changes without departing from the spirit and scope of the embodiments of the present invention. Therefore, all equivalent technical solutions also belong to the scope of the embodiments of the present invention, and the scope of patent protection of the embodiments of the present invention needs to be defined by the claims.

The present disclosure can be further understood using the following clauses.

Clause 1: A timer processing method comprising: determining to perform timer switching on a virtual local timer used by a virtual processor according to preset timer switching condition(s); determining a physical processor that runs the virtual processor, and switching a physical local timer currently used by the physical processor to a physical global timer; and performing a timer configuration for the virtual processor to enable the physical local timer to act as a timer of the virtual processor.

Clause 2: The method according to Clause 1, wherein: performing the timer configuration for the virtual processor to enable the physical local timer to act as the timer of the virtual processor comprises: adapting the virtual local timer of the virtual processor to the physical local timer, and constructing a processing function for interrupt processing for the virtual processor after adaptation; and stopping the virtual local timer, and setting a permission for the virtual processor to directly access the physical local timer.

Clause 3: The method according to Clause 2, wherein adapting the virtual local timer of the virtual processor to the physical local timer, and constructing the processing function for the interrupt processing for the virtual processor after the adaptation comprise: configuring an interrupt number of the virtual processor for the physical local timer as a preset interrupt number, and binding the preset interrupt number to the processing function for the interrupt processing, wherein the processing function is used for converting the interrupt number of the virtual processor for the virtual local timer into the preset interrupt number, and performing timer timeout processing.

Clause 4: The method according to Clause 2, wherein: adapting the virtual local timer of the virtual processor to the physical local timer comprises: adapting an operation of the virtual processor on the virtual local timer to the physical local timer through a virtual machine monitor; and stopping the virtual local timer, and setting the permission for the virtual processor to directly access the physical local timer comprises: stopping the virtual local timer, and setting the permission for the virtual processor to directly access the physical local timer through the virtual machine monitor.

Clause 5: The method according to Clause 1, wherein determining to perform the timer switching of the virtual local timer used by the virtual processor according to the preset timer switching condition(s) comprises: determining to perform the timer switching of the virtual local timer used by the virtual processor according to a running state of the virtual processor.

Clause 6: The method according to Clause 5, wherein determining to perform the timer switching of the virtual local timer used by the virtual processor according to the running state of the virtual processor comprises: determining to perform the timer switching of the virtual local timer used by the virtual processor if the virtual processor is in a virtual local timer enabled state and the virtual processor is scheduled to run.

Clause 7: The method according to any one of Clauses 1-6, wherein the physical local timer is an apic-timer, and the physical global timer is a HPET timer.

Clause 8: A timer processing apparatus comprising: a determination module configured to determine to perform timer switching on a virtual local timer used by a virtual processor according to preset timer switching condition(s); a switching module configured to determine a physical processor that runs the virtual processor, and switching a physical local timer currently used by the physical processor to a physical global timer; and a configuration module configured to perform a timer configuration for the virtual processor to enable the physical local timer to act as a timer of the virtual processor.

Clause 9: An electronic device comprising: a processor, a memory, a communication interface, and a communication bus, the processor, the memory, and the communication interface conducting inter-communications each other through the communication bus, wherein: the memory is configured to store at least one executable instruction, and the executable instruction causes the processor to perform operations corresponding to the timer processing method according to any one of Clauses 1-7.

Clause 10: A computer storage medium having a computer program stored thereon, wherein the program, when executed by a processor, implements the timer processing method according to any one of Clauses 1-7.

What is claimed is:

1. A method implemented by a computing device, the method comprising:
    determining to perform timer switching on a virtual local timer used by a virtual processor according to one or more preset timer switching conditions;
    determining a physical processor of the computing device that runs the virtual processor, and switching a physical local timer currently used by the physical processor to a physical global timer, to enable the physical processor to perform operations on the physical global timer, wherein a clock interrupt generated by the physical local timer is delivered to the physical processor of the computing device only, and a clock interrupt generated by the physical global timer is delivered to any physical processor of the computing device; and
    performing a timer configuration for the virtual processor to enable the physical local timer to act as a timer of the virtual processor.

2. The method according to claim 1, wherein: performing the timer configuration for the virtual processor to enable the physical local timer to act as the timer of the virtual processor comprises:
    adapting the virtual local timer of the virtual processor to the physical local timer, and constructing a processing function for interrupt processing for the virtual processor after adaptation; and
    stopping the virtual local timer, and setting a permission for the virtual processor to directly access the physical local timer.

3. The method according to claim 2, wherein adapting the virtual local timer of the virtual processor to the physical local timer, and constructing the processing function for the interrupt processing for the virtual processor after the adaptation comprise:
    configuring an interrupt number of the virtual processor for the physical local timer as a preset interrupt number, and binding the preset interrupt number to the processing function for the interrupt processing, wherein the processing function is used for converting the interrupt number of the virtual processor for the virtual local timer into the preset interrupt number, and performing timer timeout processing.

4. The method according to claim 2, wherein:
adapting the virtual local timer of the virtual processor to the physical local timer comprises: adapting an operation of the virtual processor on the virtual local timer to the physical local timer through a virtual machine monitor; and
stopping the virtual local timer, and setting the permission for the virtual processor to directly access the physical local timer comprises: stopping the virtual local timer, and setting the permission for the virtual processor to directly access the physical local timer through the virtual machine monitor.

5. The method according to claim 1, wherein determining to perform the timer switching of the virtual local timer used by the virtual processor according to the one or more preset timer switching conditions comprises:
determining to perform the timer switching of the virtual local timer used by the virtual processor according to a running state of the virtual processor.

6. The method according to claim 5, wherein determining to perform the timer switching of the virtual local timer used by the virtual processor according to the running state of the virtual processor comprises:
determining to perform the timer switching of the virtual local timer used by the virtual processor if the virtual processor is in a virtual local timer enabled state and the virtual processor is scheduled to run.

7. The method according to claim 1, wherein the physical local timer comprises an advanced programmable interrupt controller (APIC) timer, and the physical global timer comprises a high precision event timer (HPET).

8. One or more computer readable media storing executable instructions that, when executed by one or more processors, cause the one or more processors to perform acts comprising:
determining to perform timer switching on a virtual local timer used by a virtual processor according to one or more preset timer switching conditions;
determining a physical processor that runs the virtual processor, and switching a physical local timer currently used by the physical processor to a physical global timer; and
performing a timer configuration for the virtual processor to enable the physical local timer to act as a timer of the virtual processor.

9. The one or more computer readable media according to claim 8, wherein:
performing the timer configuration for the virtual processor to enable the physical local timer to act as the timer of the virtual processor comprises:
adapting the virtual local timer of the virtual processor to the physical local timer, and constructing a processing function for interrupt processing for the virtual processor after adaptation; and
stopping the virtual local timer, and setting a permission for the virtual processor to directly access the physical local timer.

10. The one or more computer readable media according to claim 9, wherein adapting the virtual local timer of the virtual processor to the physical local timer, and constructing the processing function for the interrupt processing for the virtual processor after the adaptation comprise:
configuring an interrupt number of the virtual processor for the physical local timer as a preset interrupt number, and binding the preset interrupt number to the processing function for the interrupt processing, wherein the processing function is used for converting the interrupt number of the virtual processor for the virtual local timer into the preset interrupt number, and performing timer timeout processing.

11. The one or more computer readable media according to claim 9, wherein:
adapting the virtual local timer of the virtual processor to the physical local timer comprises: adapting an operation of the virtual processor on the virtual local timer to the physical local timer through a virtual machine monitor; and
stopping the virtual local timer, and setting the permission for the virtual processor to directly access the physical local timer comprises: stopping the virtual local timer, and setting the permission for the virtual processor to directly access the physical local timer through the virtual machine monitor.

12. The one or more computer readable media according to claim 8, wherein determining to perform the timer switching of the virtual local timer used by the virtual processor according to the one or more preset timer switching conditions comprises:
determining to perform the timer switching of the virtual local timer used by the virtual processor according to a running state of the virtual processor.

13. The one or more computer readable media according to claim 12, wherein determining to perform the timer switching of the virtual local timer used by the virtual processor according to the running state of the virtual processor comprises:
determining to perform the timer switching of the virtual local timer used by the virtual processor if the virtual processor is in a virtual local timer enabled state and the virtual processor is scheduled to run.

14. The one or more computer readable media according to claim 8, wherein the physical local timer comprises an advanced programmable interrupt controller (APIC) timer, and the physical global timer comprises a high precision event timer (HPET).

15. An apparatus comprising:
one or more processors; and
memory storing executable instructions that, when executed by the one or more processors, cause the one or more processors to perform acts comprising:
determining to perform timer switching on a virtual local timer used by a virtual processor according to one or more preset timer switching conditions;
determining a physical processor that runs the virtual processor, and switching a physical local timer currently used by the physical processor to a physical global timer; and
performing a timer configuration for the virtual processor to enable the physical local timer to act as a timer of the virtual processor.

16. The apparatus according to claim 15, wherein: performing the timer configuration for the virtual processor to enable the physical local timer to act as the timer of the virtual processor comprises:
adapting the virtual local timer of the virtual processor to the physical local timer, and constructing a processing function for interrupt processing for the virtual processor after adaptation; and
stopping the virtual local timer, and setting a permission for the virtual processor to directly access the physical local timer.

17. The apparatus according to claim 16, wherein adapting the virtual local timer of the virtual processor to the physical local timer, and constructing the processing function for the interrupt processing for the virtual processor after the adaptation comprise:
configuring an interrupt number of the virtual processor for the physical local timer as a preset interrupt number, and binding the preset interrupt number to the processing function for the interrupt processing, wherein the processing function is used for converting the interrupt number of the virtual processor for the virtual local timer into the preset interrupt number, and performing timer timeout processing.

18. The apparatus according to claim 16, wherein:
adapting the virtual local timer of the virtual processor to the physical local timer comprises: adapting an operation of the virtual processor on the virtual local timer to the physical local timer through a virtual machine monitor; and
stopping the virtual local timer, and setting the permission for the virtual processor to directly access the physical local timer comprises: stopping the virtual local timer, and setting the permission for the virtual processor to directly access the physical local timer through the virtual machine monitor.

19. The apparatus according to claim 15, wherein determining to perform the timer switching of the virtual local timer used by the virtual processor according to the one or more preset timer switching conditions comprises:
determining to perform the timer switching of the virtual local timer used by the virtual processor according to a running state of the virtual processor.

20. The apparatus according to claim 19, wherein determining to perform the timer switching of the virtual local timer used by the virtual processor according to the running state of the virtual processor comprises:
determining to perform the timer switching of the virtual local timer used by the virtual processor if the virtual processor is in a virtual local timer enabled state and the virtual processor is scheduled to run.

* * * * *